Oct. 14, 1947.  A. K. PETERSON  2,428,890
METAL STRETCHING PRESS WHICH STRAIGHTENS AND
MOVES WORK EDGES INTO DRAWING CHUCKS
Filed April 17, 1945  4 Sheets-Sheet 1

INVENTOR.
ALBIN K. PETERSON,
BY
ATTORNEY.

Oct. 14 1947.　　　A. K. PETERSON　　　2,428,890
METAL STRETCHING PRESS WHICH STRAIGHTENS AND
MOVES WORK EDGES INTO DRAWING CHUCKS
Filed April 17, 1945　　　4 Sheets-Sheet 3

INVENTOR.
ALBIN K. PETERSON,
BY
ATTORNEY.

Oct. 14 1947.   A. K. PETERSON   2,428,890
METAL STRETCHING PRESS WHICH STRAIGHTENS AND
MOVES WORK EDGES INTO DRAWING CHUCKS
Filed April 17, 1945   4 Sheets-Sheet 4

INVENTOR.
ALBIN K. PETERSON,
BY
ATTORNEY.

Patented Oct. 14, 1947

2,428,890

UNITED STATES PATENT OFFICE 2,428,890

METAL STRETCHING PRESS WHICH STRAIGHTENS AND MOVES WORK EDGES INTO DRAWING CHUCKS

Albin K. Peterson, Torrance, Calif., assignor to Longren Aircraft Company, Torrance, Calif., a corporation of California Application April 17, 1945, Serial No. 588,795

20 Claims. (Cl. 153—48)

My invention relates to stretch presses and has particular reference to a stretch press which is capable of handling sheet material of relatively heavy gauge so as to permanently form it into a compound curved shape by stretching.

The art of stretch pressing, by which is meant the forming of metal to a curved shape and giving it a permanent set in that shape by stretching, has long been known. Various machines have been perfected to provide a form for stretch pressing operations and machines are known in the art which are provided with one type of clamping device or another for anchoring the edges of the material while the portion intermediate the edges is stretched to a predetermined shape and size. The application of stretch pressing to metal parts has been greatly stimulated by the need for sheet metal aluminum parts comprising portions of the fuselages and wing surfaces of aircraft. Improvements in design requiring the metallic surfaces of aircraft to be formed into a streamlined contour have likewise emphasized the utility of the stretch pressing art, and the need for improved technique.

As planes continue to be built to larger dimensions and as increasing strength is built into the skin portions of aircraft bodies, it becomes necessary to devise machines capable of handling sheet material of increasingly heavy gauges. Machines which have been perfected in the past for handling sheet material have not been confronted with the problem of stretching heavy gauge metal and particularly heavy gauge metal which has been preformed to an approximate shape wherein the edges are wrinkled and warped during the preforming and prior to the insertion of the preformed material into a stretch press for its final stretch. Where sheet metal is to be stretched to a contour featuring a compound curve, the warping and misalignment of edges during the preforming operation is exaggerated to such an extent that the clamps and chucks previously designed are incapable of taking hold where the edge is warped considerably out of shape.

In order to successfully clamp heavy gauge material of this kind in the clamping devices usually provided for stretch presses, some means of straightening the edges before clamping becomes necessary. Also where the material is of heavy stock and highly resistant to a small degree of bending, a power means of some kind or another becomes necessary to initially grasp the partially preformed sheet and load it into the normal draw chuck or clamping device which actually holds the sheet while the stretch pressing operation takes place.

With these requirements in view, it is among the objects of my invention to provide a new and improved stretch pressing device which is capable of handling relatively large sheets of heavy gauge material.

Another object of my invention is to provide a new and improved stretch pressing device which is capable of reshaping relatively heavy gauge material which has been warped out of shape during a prebending operation, so that the material can be properly clamped by means of conventional clamping or chucking devices.

Still another object of my invention is to provide a new and improved stretch press device by means of which partially preformed sheet material which is highly resistant to further bending may be properly grasped by power means and thereby loaded into a permanent clamp which operates during the stretch pressing operation.

Still another object of my invention is to provide a chuck unit which through a series of operations is capable of first grasping the edge of a sheet of material, straightening it, directing it toward and finally feeding it into a clamping device in order to effect a smooth and even clamping and thereby assure uniform stretching throughout the area of the sheet.

A further object of my invention is to provide a chucking unit adapted to grasp the long edge of a sheet of material to be stretched which can be adjusted to a proper bias in order that the material may be properly drawn over a forming head having a compound curvature of the surface which is pressed into contact with the sheet.

A still further object of my invention is to provide a chucking unit for a stretch press device which consists of independent chucks, one for initially grasping the edge of a sheet of material having an initial position incapable of being properly clamped by the normal draw chuck and then by a loading operation drawing the material into a position wherein it can be most effectively clamped by the draw chuck preliminary to a stretching operation.

Also among the objects of my invention is to provide power means for a chuck unit wherein the devices for the application of power have been reduced to relatively minimum so that no more operating parts than necessary may be required to effect movement of the jaws through their several operations.

Another object is to provide chucking devices for grasping the ends of sheet material as used in a stretch press which are so adjustable with relation to the press that they can be adapted for use with a wide variety of shapes and sizes of forming heads.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 1:
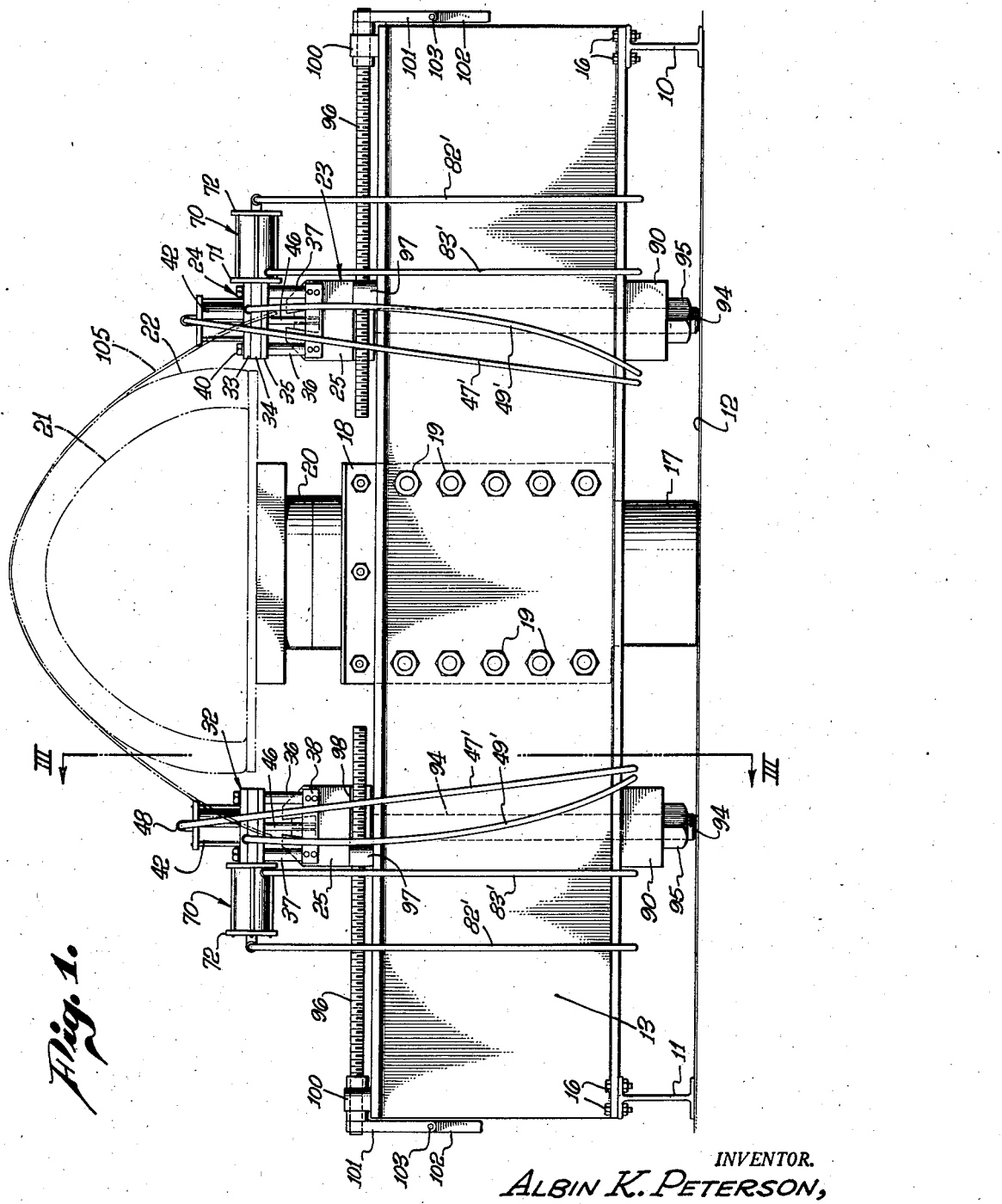
Fig. 1 is an end elevational view of a stretch press equipped with the chucking unit comprising the present invention.
Figure 2:
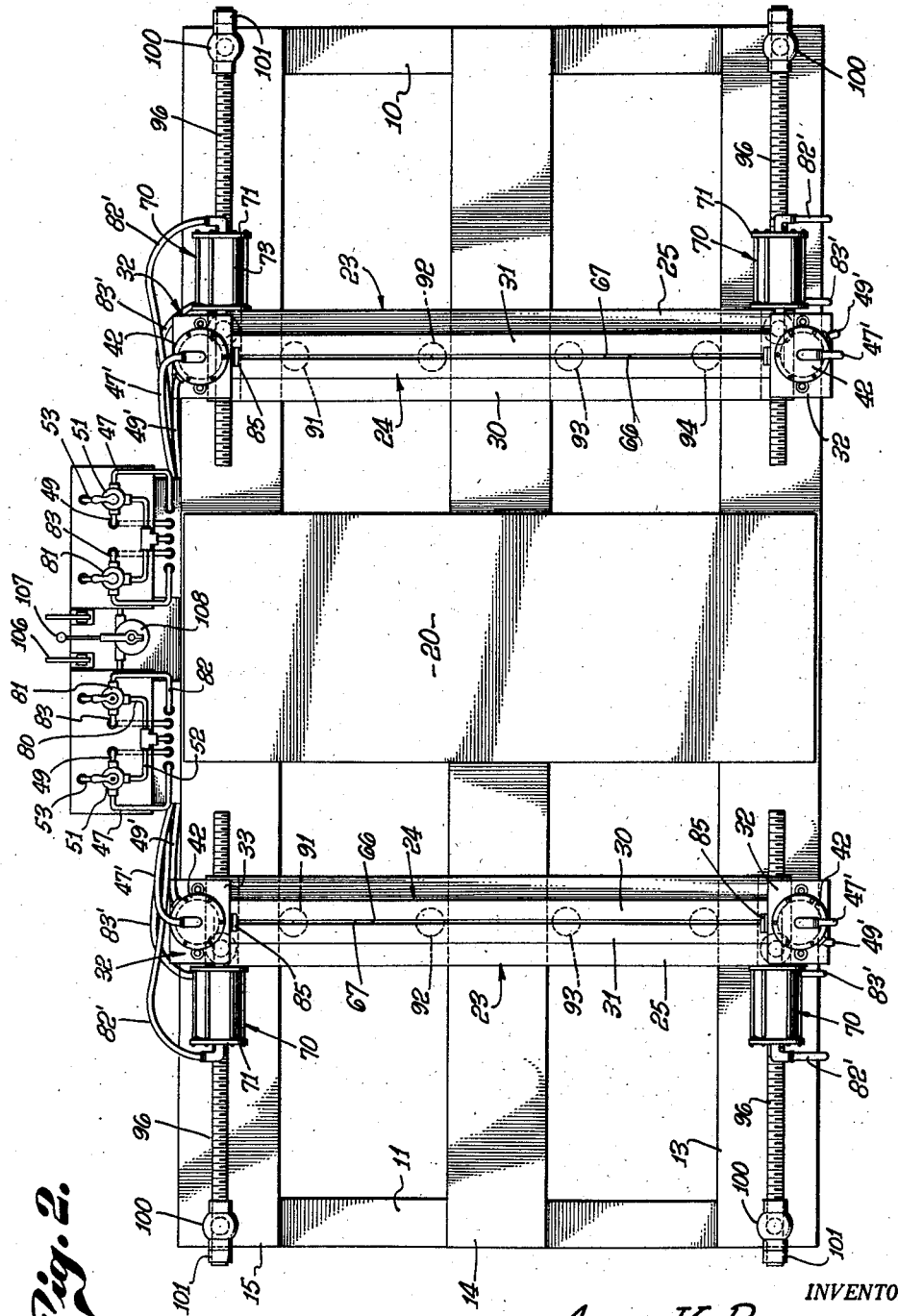
Fig. 2 is a plan view of the machine shown in Fig. 1.
Figure 3:
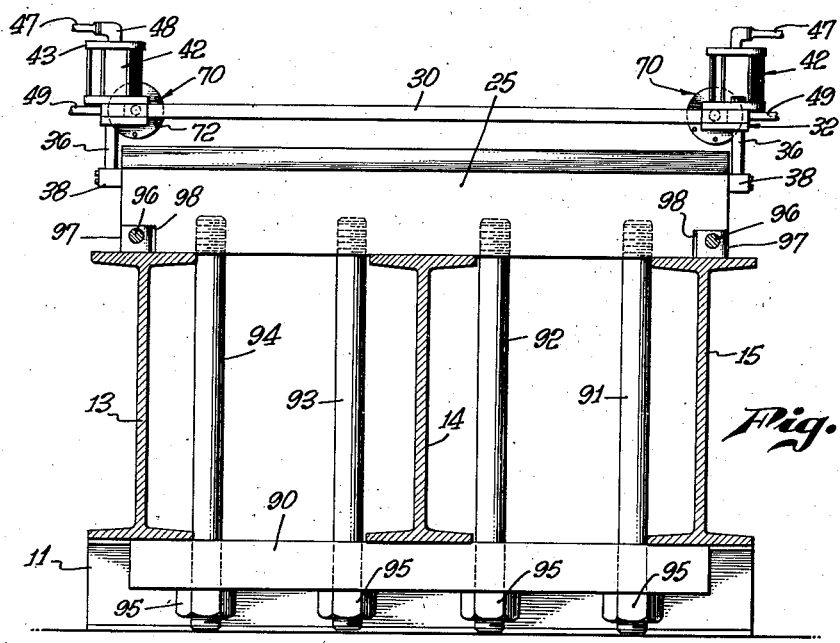
Fig. 3 is a longitudinal sectional view of the machine taken on the line III—III of Fig. 1.

It has long been known that metal can be improved as to its tensile strength and other characteristics by imparting to the metal a definite stretch when the metal has been heated to certain temperatures which have been found most advantageous to the practice of this treatment. The most common forms of material for which stretch presses have been provided is sheet material. Under ordinary circumstances, sheet material is relatively thin and thin gauge material has not been difficult to handle even though used in relatively large sheets. Clamping devices for holding thin material have not needed to be of heavy construction, since the relatively thin gauges of material have been capable of being pressed into a satisfactory clamp without great difficulty being experienced. This is particularly true where the sheet material is to be stretch pressed into a plane, curved shape.

As stretch pressing has been adapted to the formation of aircraft parts and particularly the skin for fuselages and wing sections, it has been necessary to stretch the material to a compound curve, that is to say, the contour of the finished piece will curve in different directions, sometimes described in geometric terms as warped surfaces. When sheet material is to be given a compound curve by stretch pressing, more attention must be given to properly clamping the edge of the material so that the strain will be evenly distributed over the sheet as one part is stretched and bent more than another. Various devices have been suggested for accomplishing this.

Heavy gauge skin sections have become increasingly popular since it has been found that by making the skin section heavy, internal bracing can be dispensed with and the skin section relied upon for strength and rigidity. Furthermore, in the production of skin sections, which may also serve the purpose of armor, a relatively heavy gauge becomes highly essential. Machines which have been readily adapted to the stretching of thin gauge material in the past are found to be inadequate to perform a stretch pressing operation on heavy sheet material.

When sheet material of heavy gauge is to be stretch pressed, it must invariably be preformed or prebent so that it can be readily applied to the stretch pressing machine, as otherwise it would be practically impossible to manually bend the edges of the material in such a direction that they could be clamped between the jaws of a draw chuck or clamping device. These jaws or clamping devices normally have only a relatively narrow clearance in open position so that the edge of the sheet material must be pushed into almost precise alignment with the jaws before it can be positioned in the space between the jaws for clamping. Preforming of heavy gauge material becomes necessary for this reason.

When heavy sheet material is preformed, a new problem arises. During the preforming operation, particularly where the sheet is given a compound curve, the edges of the material become very wavy and warped. The warping and waving of the edges is so great in most instances that it is impossible to insert them into the space between the jaws of a normally designed draw chuck. Some means, therefore, of straightening out the wavy condition at the edge of the sheet becomes necessary, since otherwise it could not be inserted between the jaws.

To perform this operation quickly, efficiently and automatically, the applicant has proposed a chuck unit consisting of two separate and individually operated chucks which cooperate one with the other so that one chuck initially grasps the wavy edge of a heavy stiff material, straightens it and then draws it into a position wherein it can be grasped by a second chuck capable of exerting a tighter hold upon the edge of the material sufficient to hold it against the intense pull exerted when the stretch pressing operation is actually performed.

In the embodiment chosen to illustrate my invention, there is provided a stretch press comprising a frame having a pair of footings 10 and 11 which, in the embodiment chosen, consist of I-beams positioned with the webs in vertical position so that the flanges rest upon a floor or platform 12. The footings in turn support a series of lateral beams 13, 14 and 15 which are positioned parallel to each other and stretch from one footing beam to the other to which they may be bolted by means of bolts 16. Midway between the ends of the I-beams there is provided a large hydraulic cylinder 17 including a cylinder housing 18 which is secured to the outermost I-beam on each side by means of bolts 19. The hydraulic cylinder is provided with a piston 20 on top of which is mounted a forming head 21 which has a curved outer surface 22 having the curve to which it is desired to stretch press the sheet material forming the work.

A pair of chuck units is provided one on each side of the forming head and extends throughout the length of the head on each side. The chuck units are complementary to each other and identical as to details so that only one need be described.

Figure 6:
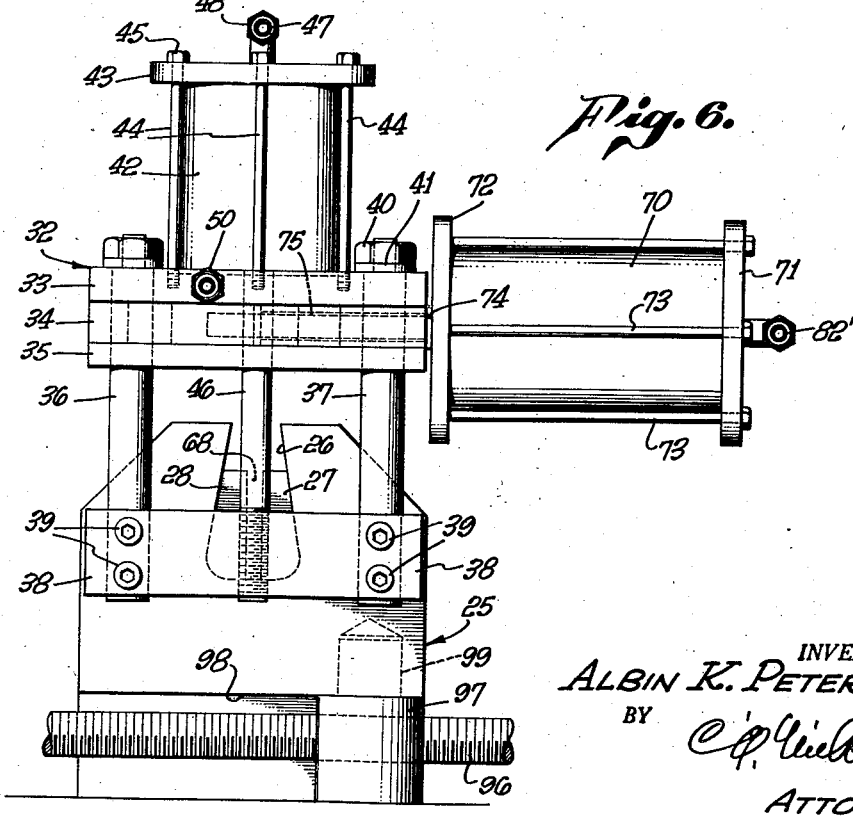
Fig. 6 is an end view of a portion of the device looking in the direction of the arrow in Fig. 5.

Each chuck unit comprises a lower chuck herein designated as a draw chuck 23 and an upper chuck herein designated as a loading and straightening chuck 24. The draw chuck includes a chuck housing 25 which extends from one side of the machine to the other and spans the top flanges of the parallel I-beams. In the draw chuck housing is a wedge-shaped aperture 26 in which is positioned a pair of chuck jaws 27 and 28 having the same slope at the outside surface as the aperture 26 and adapted to slide respectively up and down relative to the aperture as viewed in Fig. 6. Hydraulic or pneumatic means may be provided for shifting the jaws 27 and 28 up and down in order to effect a clamping adjustment. As the jaws are moved upwardly they are pressed together by the sides of the aperture 26 and forced into engagement with a sheet of material inserted between them. These are the jaws which hold the sheet material while the stretch pressing operation actually takes place. They may be of some conventional and known design as to details.

Since the breadth of the opening of the jaws 27, 28 is relatively limited, any piece of sheet material which is to be inserted between them must be relatively straight. Since straight edged sheets are not always available, some means for straightening the sheet before insertion into the space between the jaws is necessary.

In this invention a straightening device suitable for this purpose is embodied in a second chuck, herein designated as a straightening or loading chuck which incorporates a pair of jaw bars 30 and 31. These jaw bars extend from one side of the forming head to the other over substantially the same distance as the draw chuck. For holding the jaw bars in place there is provided a support 32 at the end of each pair of jaw bars which includes three plates 33, 34 and 35. The supports in each instance are guided into proper position by means of guide posts 36 and 37. As will be noted particularly in Fig. 6, the guide posts are secured to a bracket 38 at the end of the draw chuck housing 25 by means of machine screws 39. The upper ends of the guide posts in each instance extend through the plates forming the supports and are capped by means of a nut 40 threaded upon the guide posts and a washer 41. The nut and washer limit upward movement of the supports together with the jaw bars. The supports are free to slide up and down the guide posts.

In the embodiment shown, a power means is included for forcibly drawing the jaw bars downwardly to a position adjacent the draw chuck and subsequently for reversing the movement so that the jaw bars are moved away from the draw chuck. This device is incorporated into a pneumatic cylinder 42 provided with a head 43 anchored to the plate 33 by means of stringer bolts 44. The bolts threadedly engage the plate 33 and extend through cylinder head 43 to which they are bolted by nuts 45. Within the pneumatic cylinder is a piston, not shown, held by a piston rod 46 which extends downwardly until it threadedly engages the bracket 38.

For operating the cylinder, there are provided two fluid lines normally designed to carry compressed air. One fluid line 47 enters the cylinder through a fitting 48 on the cylinder head. The other fluid line 49 enters the cylinder through a fitting 50. The fluid lines 47 and 49, for example, are shown attached to a 4-way pneumatic valve 51 and through flexible extensions 47' and 49' respectively move the pneumatic cylinder. The pneumatic valve 51 simultaneously operates the cylinders at both ends of the chuck by means of interconnecting fluid lines. A compressed air supply line 52 supplies compressed air to the 4-way valve. An exhaust line 53 provides an outlet from the 4-way valve.

The jaw bars 30 and 31 which provide the clamping device for the loading and straightening chuck previously referred to extend respectively into recesses 60 and 62 in the support 32 which provides for them a relatively loose fit so that they are free to move in a lateral direction. A bottom 63 in the recess 60 provides an abutment against which the outside edge of the jaw bar 30 is pressed into contact, thereby limiting its movement laterally when in open position. Lateral movement of the jaw bar 31 is limited by the provision of an extension 64 on the jaw bar, the outer edge of which is designed to come into contact with a bottom 65 in the recess 62 in order to limit movement of the jaw bar outwardly.

It will be noted that the jaw bars 31 and 32 have inside clamping edges 66 and 67 respectively which form a closing line for grasping the sheet of material which is in alignment with a closing line 68 of the draw chuck. It should likewise be noted that there is a free and clear space through and below the jaw bars so that sheet material held between the jaw bars may extend entirely through and past the straightening and loading chuck to a position where it can be received between the jaws of the draw chuck.

For shifting the jaw bars between open and closed position, there is provided a pneumatic cylinder indicated generally by the character 70 which has a cylinder head 71 bolted to a second cylinder head 72 by means of spanner bolts 73. The cylinder head 72 in turn is secured by means not shown to a lateral extension 74 at the end of the jaw bar 31. A recess is provided in the support 32 so that the extension 74 is free to reciprocate in a lateral direction.

The cylinder 70 is provided with a conventional piston not shown from which extends a piston rod 75. The extension 74 and jaw bar 31 are provided with a bore 76 substantially larger than the piston rod so that a loose fit is provided for the rod. The rod extends through the bore and has a threaded end 77 which engages the jaw bar 30.

For operating the cylinder, compressed air lines are provided which are supplied from a line 80 through a 4-way valve 81. One supply line 82 is connected to the cylinder through the cylinder head 71 by means of a flexible line 82' and a second supply line 83 is connected by means of a flexible line 83' to the opposite end of the cylinder adjacent the cylinder head 72. The valve 81 simultaneously operates the cylinder at each end of the chuck through interconnected lines. Compressed air can therefore be supplied to the cylinder on either side of the piston so that the cylinder can operate in both directions. Since the cylinder itself is attached to one of the jaw bars 31 and the piston is attached to the other jaw bar 30, both jaw bars will be moved simultaneously when the cylinder is actuated.

In order that when the jaw bars are moved to a closed position they will be properly centered on every occasion, there is provided a centering block or element 85 which is secured to the upper plate 33 of the support 32 by means of bolts 86. The centering block extends downwardly to a position between the jaw bars 30 and 31. The jaw bars in turn are respectively provided with recesses 87 and 88, the bottoms of which are spaced a distance from the centerline of the jaw bars in closed position equal to the distance between the center of the centering block and the outside edge. By use of this device, should one of the jaw bars be advanced more rapidly than the other, it will be stopped in center position by the centering block while the other jaw bar is being moved up to a center position. When the operation is reversed, both jaw bars are moved laterally outwardly to an extent limited by the recesses in the support 32 which receive them.

A stretch press of the sort herein described must be adapted to operate with a wide variety of shapes and sizes of forming heads. Each different job is apt to require a curved sheet having a different contour from the previous job. One of the great advantages in stretch pressing is the ease with which forming heads can be substituted one for another. If this interchange is to be practiced, however, it is necessary that the chucking device be equally versatile. To this end the chucking device must be capable of being moved laterally over a considerable distance to accommodate forming heads of different widths and also to be shifted on a bias either initially or during the stretch pressing operation to accommodate forming heads of odd shapes wherein the stretch may be much greater on one end than on the other.

To provide for adjustability of the chucking device, there is incorporated as a part of the chucking unit a tie bar 90 of heavy metal stock which is positioned beneath the I-beams 13, 14 and 15 and extends in a direction parallel to the draw chuck housing 25. The tie bar, in effect, provides an anchor for holding the chuck unit in place during the stretching operation. The tie bar is secured to the draw chuck housing by means of tie rods 91, 92, 93 and 94 which have a threaded engagement in the bottom of the draw chuck housing and extend downwardly through the tie bar. Nuts 95 are attached to the bottom ends of the tie rods and can be adjusted so that the tie bar is perfectly level and will be drawn upwardly into contact with the bottom flanges of all of the I-beams at the same time.

In order to permit the chucking unit to be shifted laterally with respect to itself, the tie bar must be normally free from contact with the bottom flanges of the I-beams so as to, in effect, float beneath the I-beam structure. The clearance need only be sufficient so that there is no actual contact.

For shifting the ends of the chucking unit there is provided at each end a horizontal adjusting screw 96 threaded throughout most of its length. Beneath each end of the draw chuck housing is a swiveled stud 97 which is located in a recess 98 at the end of the draw chuck housing. The stud has a reduced portion 99 which extends upwardly into the draw chuck housing where it is swivelly secured in place. The horizontal adjusting screw extends threadedly through the stud 97. At the end of the adjusting screw remote from the chuck housing, there is provided a bracket 100 in which the end of the adjusting screw is journaled. The bracket in turn is fastened to the end of the I-beam flange so that it remains fixed while the screw is being operated. At the free end of the screw there is provided a crank 101 at the end of which is a handle 102 pivoted to the crank at the point 103 so that the handle may be raised to an operating position while the screw is being manipulated and then permitted to fall to an inoperative position as shown in Fig. 1, where it will not protrude so as to be an obstruction to persons working around the machine. The mounting and operation of the adjusting screw at each corner of the stretch press is the same as just described.

In operation, it is customary to use a stretch press of this sort to bend large sections of relatively heavy sheet material over a forming head similar in shape and size to that shown in Fig. 1. The sheet material is customarily given an initial bend so that it has approximately the shape of a section indicated by the reference character 105 as shown in Fig. 1. The sheet is merely bent to this approximate shape to make it possible to get it into the machine because it would be impossible to bend by hand sheet material having a thickness in the neighborhood of ⅛ in. to ¼ in. In the initial bending the edge of the sheet material is apt to be warped considerably and the edges of successive sheets will not extend uniformly in the same angular direction downwardly from the forming head when placed thereon. Since draw chucks and the customary clamping devices used in stretch presses of this kind have only a relatively narrow opening in full open position, it is practically impossible to insert the warped edge of a heavy sheet in the space between the draw chuck jaws even when opened to their widest position. Because of the fact that the draw chuck jaws must be so designed as to exert a maximum grip upon the sheet during the stretching operation, it is not feasible to design them so that they open wide enough to encompass a badly warped edge of the sheet material. The auxiliary straightening and loading jaws forming a part of the subject matter of this invention are therefore provided to assist in loading the draw chuck.

Figure 5:
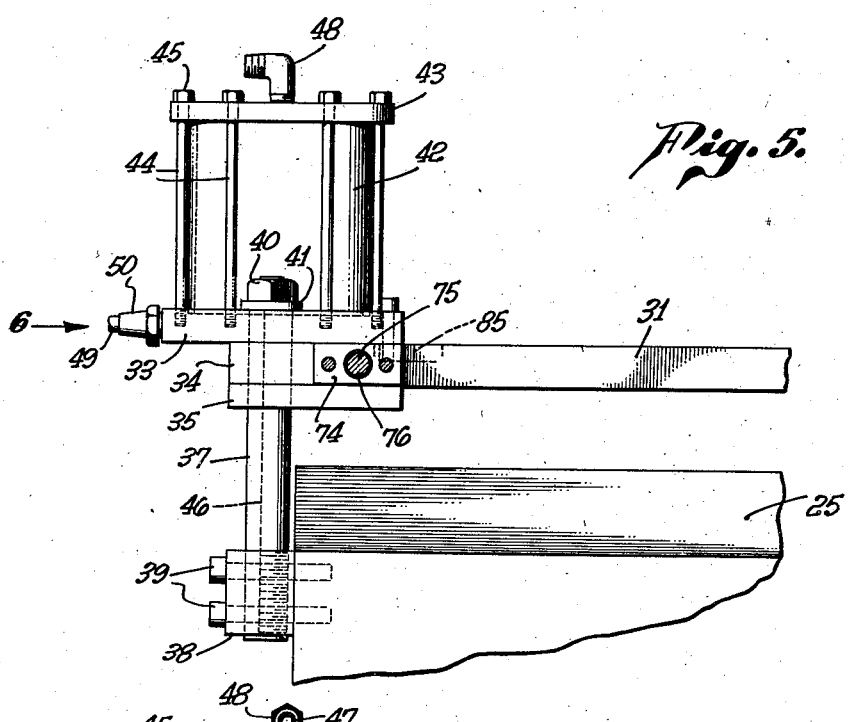
Fig. 5 is a sectional view of a portion of the device taken on the line V—V of Fig. 4.

After the sheet has been placed on top of the forming head, the edges will extend downwardly toward the chucks on each side. In order to place the straightening and loading chuck in a position to receive the edge of the sheet material, air is let into the pneumatic cylinder 42 on the upper side of the piston. The piston is then extended relative to the cylinder and since the piston rod 46 is anchored to the draw chuck housing, the cylinder is therefore elevated, carrying with it the support 32 which in turn lifts the respective ends of the jaw bars to an uppermost position, such as that illustrated in Figs. 1, 5 and 6.

Figure 4:
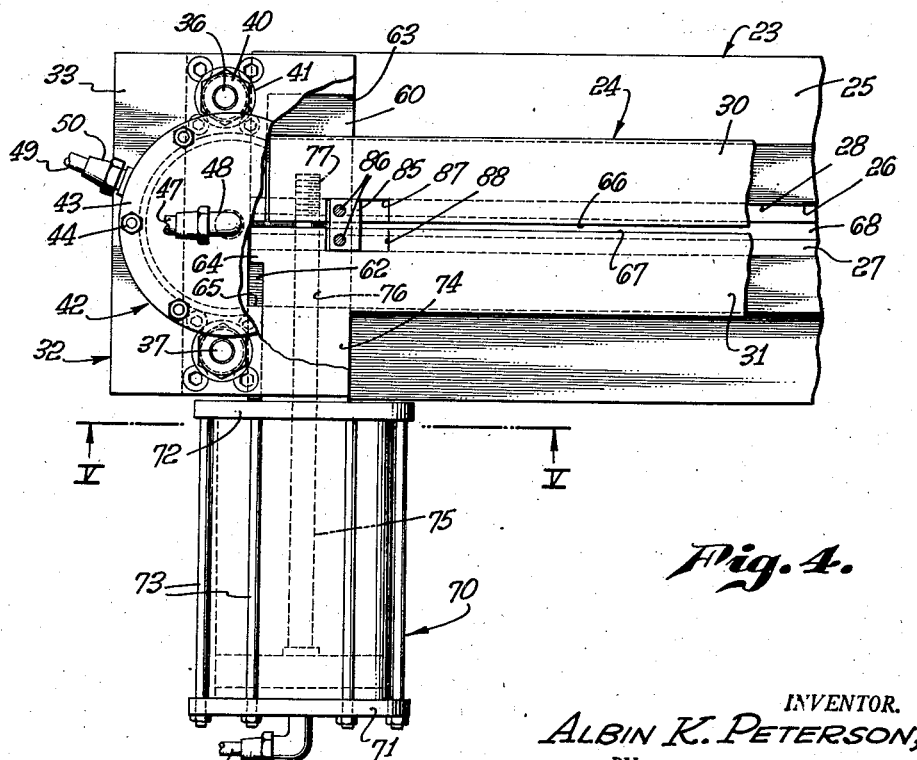
Fig. 4 is a partial plan view of one end of one of the chucking units partially broken away.

It is usually advisable to open the jaw bars 30, 31 before they are lifted into position. To accomplish this, air pressure is admitted to the outside end of the cylinder 70. The air pressure will therefore force the piston rod 75 in a direction so as to move the jaw bar 30 away from a center position as best seen in Fig. 4. Simultaneously, the cylinder will be forced in an opposite direction which, acting through the cylinder head 72 secured to the jaw bar 31 through the extension 74, will pull the jaw bar 31 away from a center position. The jaw bar 30 will be extended laterally until it abuts the bottom 63 of the recess 60, whereas the jaw bar 30 will be extended until the extension 64 abuts the end 65 of the recess 62. This will provide an opening of several inches between the clamping edges 66 and 67 of the jaw bars.

The opening thus formed will be sufficiently wide to accommodate the edge of a sheet warped even to a very considerable extent. Also because of this relatively wide opening between the jaw bars, the edge of the sheet will be permitted to be inserted between them even though the sheet is directed toward them at a considerable angle, as for example, the angle of the edge of the sheet shown in Fig. 1. At this angle, it would be practically impossible to insert a heavy sheet between the jaws of a draw chuck having, as they do, only a narrow space between them.

After the jaw bars have been raised to a position so that the edge of the sheet extends between them, the forming head can be lowered a slight amount if need be so that the edge of the sheet material extends entirely through the space between the jaw bars and protrudes a substantial distance below them. This is necessary to provide an edge for insertion into the draw chuck. If the preformed sheet does not extend laterally at too great an angle, it may not be necessary to move the forming head, since the jaw bars can be lifted high enough so that the edge of the sheet will extend through them a sufficient distance.

At this point air pressure is applied to the cylinder 70 at the opposite or inside end adjacent the cylinder head 72 and permitted to exhaust from the end adjacent the head 71. Pressure thus applied will draw the piston rod into the cylinder and this action will close the jaw bars, so that they occupy the positions shown in Fig. 4. A slight space may be left between them in closed position but this will always be smaller than the thickness of the material which is to be used. In closed position the jaw bar 30 will be drawn to a position where it abuts one side of the centering block and the jaw bar 31 to a position where it abuts the other side. The material will thus be straightened by the clamping action of the jaw bars and will at the same time be aligned with the opening 68 of the draw chuck.

While the jaw bars remain clamped, air pressure is then applied to the lower end of the cylinder 42 and permitted to exhaust from the upper end. The air pressure thus applied will draw the piston rod 46 into the cylinder and as a consequence, the cylinder together with the attached support 32 and the jaw bars will be drawn downwardly to a position wherein the free end of the sheet material will be inserted into the space 68 between the jaws of the draw chuck. At this point the draw chuck jaws will be closed by manipulation of a pneumatic control 106. After the sheet has been clamped by the draw chuck, air pressure is reversed in the cylinder 70 which will cause the jaw bars to open and release the sheet material. With the edges of the sheet thus securely clamped, hydraulic pressure is applied by manipulating a handle 107 of a hydraulic valve 108 at which point the forming head 21 is raised, thereby stretching the sheet material which remains securely fastened at its edges. After the stretch has been completed, the draw chuck jaws are released by manipulation of the valve 106, the sheet is removed and the chucking unit is then ready for another operation.

Cranks 101 may be operated at any time for the purpose of moving or placing the chucking units in parallel or in angular relation to each other, depending upon the type of curve to be imparted to the sheet metal by forming head 21, 22.

There has accordingly been provided a chucking device of special character for use in stretch pressing operations which is especially adapted to the handling of heavy sections by providing a cooperating pair of elongated chucks of the kind herein described. Careful prebending of heavy stock is made unnecessary inasmuch as one of the chucks is so designed that it is adapted to grasp, straighten and redirect the edge of a prebent sheet in such a manner that it can be loaded into a draw chuck for holding it during stretching. The initial chuck is, moreover, so designed that once the prebent sheet is loaded into the draw chuck, the operative parts of the initial chuck can be withdrawn so as not to encumber the stretching operation regardless of the bias which the chucking unit occupies during the stretch.

It is to be understood that the sheet metal may be heat treated or rendered formable before stretch pressing and the stretch pressing then carried on until the metal is stretch hardened. In some instances (depending upon the alloy or metal used and its physical properties) the stretch-pressed piece may be trimmed or cut to final size (by removing the metal ordinarily held by the draw chucks, etc.) and then heat treated, hardened, etc.

It is to be understood that the description and drawings show an exemplary form of machine embodying the invention. Many changes may be made, such as substitution of hydraulic for pneumatic pressure fluid, location and form of means for varying the angular relation of the chuck units, etc., without departing from the inventive teachings of the claims.

I claim:

1. In a stretch press for sheet material including a frame and a forming head the combination of: a chuck unit comprising a draw chuck extending across the frame adjacent the forming head adapted to grasp the material adjacent an edge thereof; a secondary chuck between the draw chuck and the forming head providing clearance therethrough for the sheet material in substantial alignment with the draw chuck, and a power device connected to the respective chucks adapted to move said chucks toward each other.

2. In a stretch press adapted to the forming of relatively heavy sheet material and including a forming head, the combination of: a draw chuck adapted to hold the edge of the sheet during stretching over said head and a straightening chuck for straightening edges of the sheet prior to insertion into the draw chuck, said straightening chuck comprising a pair of jaw bars having clamping edges adapted to be initially spaced apart in alignment with the draw chuck and between said draw chuck and forming head, a support for each pair of adjacent jaw bar ends, a stationary centering block cooperable with the jaw bars at center position, and a power actuated device at each pair of jaw bar ends for alternately clamping and separating said jaw bars comprising one element of the device attached to one of said jaw bar ends, a second element secured to the opposite jaw bar end and a power device operable between said elements whereby both adjacent ends of the jaw bars are moved to a clamping position at the center and removed therefrom.

3. In a stretch press adapted to the forming of relatively heavy sheet material into multicurved sections, the stretch press including a forming head and a draw chuck adapted to hold the edge of the sheet during stretching over said head, the combination of: a straightening chuck for straightening edges of a pre-bent sheet prior to insertion into the draw chuck, said straightening chuck comprising a pair of jaw bars adjacent the forming head and between the forming head and draw chuck, said jaw bars having clamping edges adapted to be initially spaced apart, a support for each pair of adjacent jaw bar ends, and a fluid-actuated device at each end of the pair of jaws for clamping and separating said jaw bars comprising a cylinder attached to the outside face of the adjacent jaw bar, a piston therein and a piston rod extending from the piston and secured to the opposite jaw bar whereby both adjacent ends of the jaw bars are moved to a clamping position on the sheet and removed therefrom.

4. In a stretch press adapted to the forming of relatively heavy and partially preformed sheet material into multicurved sections, including a forming head having multicurved side surfaces, and a draw chuck adapted to hold the edge of the sheet during stretching over said head, the combination of: a straightening chuck for straightening edges of the preformed sheet prior to insertion into the draw chuck, said straightening chuck being positioned between the draw chuck and forming head and comprising a pair of relatively long jaw bars having clamping edges adapted to be initially spaced apart a relatively great distance, a support for each pair of adjacent jaw bar ends, a stationary centering block having shoulders thereon, abutments at the ends of the jaw bars adjacent said block having an abutting relationship with the shoulders when the jaw bars are centered, and a fluid-actuated means for alternately clamping and separating said jaw bars comprising a cylinder attached to the outside face of the adjacent jaw bar, a piston therein and a piston rod extending from the piston and secured to the opposite jaw bar whereby both jaw bars are simultaneously moved to a clamping position at the center and removed therefrom.

5. In a stretch press adapted to the forming of relatively heavy and partially preformed sheet material into multicurved sections, including a forming head having multicurved side surfaces, and a draw chuck adapted to hold the edge of the sheet during stretching over said head, the combination of: a straightening chuck in alignment with the draw chuck for straightening edges of the preformed sheet prior to insertion into the draw chuck, said straightening chuck comprising a pair of relatively long jaw bars adjacent the outer edge of the forming head having clamping edges adapted to be initially spaced apart a relatively great distance, a support for each pair of adjacent jaw bar ends, a stationary centering block having shoulders thereon, abutments at the ends of the jaw bars adjacent said block having an abutting relationship with the shoulders when the jaw bars are centered; and a fluid-actuated device at each end of the pair of jaw bars for alternately clamping and separating said jaw bars comprising a cylinder attached to the outside face of the adjacent jaw bar, a piston therein and a piston rod extending from the piston and secured to the opposite jaw bar, whereby both adjacent ends of the jaw bars are simultaneously moved to a clamping position at the center and removed therefrom by the same cylinder and piston.

6. In a stretch press adapted to the forming of relatively heavy and partially preformed sheet material into multicurved sections, including a forming head having multicurved side surfaces, and a draw chuck adapted to hold the edge of the sheet during stretching over said head, the combination of: a straightening chuck in alignment with the draw chuck for straightening edges of the preformed sheet prior to insertion into the draw chuck, said straightening chuck being positioned between the draw chuck and forming head and comprising a pair of relatively long jaw bars extending from one side to the other and having clamping edges adapted to be initially spaced apart a distance several times the thickness of the sheet, a support for each pair of adjacent jaw bar ends including a plate and a centering block attached thereto at the centerline of the straightening chuck having edges extending laterally relative to the centerline, recesses at the ends of the jaw bars adjacent said block having bottoms thereof spaced from the clamping edges a distance equivalent to the distance between the centerline and the corresponding edge of the centering block, and a fluid-actuated device at each end of the pair of jaw bars for alternately clamping and separating said jaw bars comprising a cylinder attached to the outside face of the adjacent jaw bar, a piston therein and a piston rod extending from the piston slidably through said adjacent jaw bar and secured to the opposite jaw bar whereby both adjacent ends of the jaw bars are adapted to be simultaneously moved to a clamping position at the center and subsequently removed therefrom by the same cylinder and piston.

7. In a stretch press adapted to the forming of relatively heavy sheet material into curved sections, including a supporting frame, a forming head on the frame, and a draw chuck positioned on the frame adjacent the edge of the head for holding the edge of said sheet during a stretching operation, provided with an elongated housing and a pair of jaws therein movable to a sheet-grasping position, the combination of: a loading chuck comprising a pair of opposed jaw bars having a relatively wide initial separation disposed parallel to the draw chuck jaws and spaced therefrom, power means carried by the loading chuck adapted to close and open said jaw bars, a centering element cooperable with the jaw bars in substantial alignment with the draw chuck, and a fluid power device adapted to move said loading chuck from an initial position spaced from the draw chuck to a loading position nearer the draw chuck comprising a support for the pair of jaw bars, a pneumatic cylinder element, a piston element in the cylinder element having a piston rod extending therefrom, one of said elements being secured to the support and the other being secured to the draw chuck housing and a fluid power line to the cylinder adapted when air is supplied under pressure alternately to shift said loading chuck and the sheet carried thereby to a position wherein the sheet is located between the jaws of the draw chuck and to shift the jaw bars away from the draw chuck to the initial position.

8. In a stretch press adapted to the forming of relatively heavy and partially preformed sheet material into compound curved sections, including a supporting frame, a forming head on the frame, and a draw chuck positioned on the frame adjacent the edge of the head for holding the edge of said sheet during a stretching operation, provided with an elongated housing having a longitudinal recess flared outwardly from the gripping line and a pair of jaws therein movable toward the small end of the opening in sheet-grasping position, the combination of: a loading chuck comprising a pair of opposed jaw bars having an initial separation wider than the draw chuck jaws disposed parallel to the draw chuck jaws and spaced therefrom, power means carried by the loading chuck adapted to close and open said jaw bars, a centering element cooperable with the jaw bars in substantial alignment with the draw chuck, and a fluid power device adapted to move said loading chuck from an initial position spaced from the draw chuck to a loading position nearer the draw chuck and including a support at each end of said pair of jaw bars, a cylinder element and a piston element in the cylinder element having a piston rod extending therefrom, one of said elements being secured to the support and the other being positioned adjacent the draw chuck housing, connection means for securing said last element to the housing and a fluid power line to the cylinder on each side of the piston adapted alternatively when air is supplied under pressure on one side of the piston to shift said loading chuck and the sheet carried thereby to a position wherein the sheet is located between the jaw of the draw chuck and when the other side is under pressure to shift the jaw bars away from the draw chuck to the initial position.

9. In a stretch press adapted to the forming of relatively heavy and partially preformed sheet material into compound curved sections, including a supporting frame, and a forming head on the frame, the combination of: a draw chuck positioned on the frame adjacent the edge of the head for holding the edge of said sheet during a stretching operation, comprising an elongated housing having a longitudinal recess flared outwardly from the gripping line and a pair of jaws therein having a relatively narrow maximum extension movable toward the small end of the opening in sheet-grasping position; a loading chuck comprising a pair of opposed jaw bars having an initial separation several times the thickness of the sheet material disposed parallel to the draw chuck jaws and spaced therefrom, power means carried by the loading chuck adapted to alternately close and open said jaw bars, a centering element cooperable with the jaw bars in substantial alignment with the center of the draw chuck, and a fluid power device adapted to move said loading chuck from an initial position spaced from the draw chuck to a loading position adjacent the draw chuck comprising a support at each end of said pair of jaw bars, a pneumatic cylinder on said support and movable therewith, a piston in the cylinder having a piston rod extending therefrom to a position adjacent the draw chuck housing, connection means for securing the piston rod to the housing and a pneumatic power line to the cylinder on each side of the piston adapted when air is supplied under pressure on one side of the piston to shift said loading chuck and the sheet carried thereby to a position wherein the sheet is located between the jaws of the draw chuck and adapted alternately when the other side is under pressure to shift the jaw bars away from the draw chuck to the initial position.

10. In a stretch press adapted to the forming of a sheet material into a curved section, the combination of: a draw chuck for holding the edge of the sheet during a stretching operation, comprising an elongated housing and reciprocable jaws therein for grasping the material; a combined straightening and loading chuck comprising a pair of jaw elements spaced from the draw chuck having a closing line in substantial alignment with the closing line of the draw chuck and having an initial position spaced relatively wide apart, means for closing the jaws on the sheet material along a line inwardly from the edges comprising cooperating power-actuated members cooperable with the jaw elements; and means for moving said loading chuck in either open or closed position toward and away from the draw chuck comprising cooperating power-actuated members cooperable respectively with the loading chuck and the draw chuck housing adapted to initially urge said loading chuck away from the draw chuck and alternately to move said loading chuck toward said draw chuck to a position wherein the respective jaws of each lie adjacent and in substantial alignment.

11. In a stretch press adapted to the forming of a relatively heavy sheet material into a curved section, the combination of: a draw chuck for holding the edge of the sheet during a stretching operation comprising an elongated housing and reciprocable jaws therein for grasping the material; a combined straightening and loading chuck mounted on and carried by the draw chuck housing comprising a pair of jaw elements parallel to and spaced from the draw chuck having a closing line in substantial alignment with the closing line of the draw chuck and having an initial position spaced relatively wide apart; means for closing the jaws on the sheet material along a line spaced inwardly from the edges comprising a cylinder on the side of one jaw subject to fluid pressure and a piston rod extending from the cylinder past said one jaw into engagement with the other jaw; and means for moving said loading chuck in either open or closed position toward and away from the draw chuck comprising a support for each end of the loading chuck, a cylinder on the support subject to fluid pressure, a piston rod extending from the cylinder into engagement with the draw chuck housing adapted to be initially urged away from said loading chuck and having an operative movement toward said draw chuck to a position wherein the respective jaws of each lie adjacent and in substantial alignment.

12. In a stretch press adapted to the forming of a relatively heavy and partially preformed sheet material into a compound curved section, including a supporting frame and a forming head cooperable therewith, the combination of: a draw chuck adjacent the edge of the frame for holding the edge of the sheet during a stretching operation comprising an elongated housing and reciprocable jaws therein for grasping the material; a combined straightening and loading chuck mounted on and carried by the draw chuck housing comprising a pair of jaw bars parallel to and spaced from the draw chuck having a closing line in substantial alignment with the closing line of the draw chuck and having an initial position spaced relatively wide apart; pneumatic power means for closing the jaws on the sheet material along a line inwardly from the edges comprising a pneumatic cylinder on the side of one jaw and a piston rod extending past said one jaw into engagement with the other jaw; and a second pneumatic power means operable independently of the first pneumatic means for moving said loading chuck toward and away from the draw chuck in either open or closed position, comprising a support for each end of the loading chuck, guide posts at each end between the respective supports and the draw chuck housing, a pneumatic cylinder on the support, a piston rod extending from the cylinder and secured to the draw chuck housing adapted upon injection of air pressure in one side thereof to initially urge said loading chuck away from the draw chuck and when subjected to air pressure on the opposite side having a movement toward said draw chuck to a position wherein the respective jaws of each lie adjacent and in substantial alignment.

13. In a stretch press adapted to the forming of sheet material into a shaped section including a frame comprising supporting beams, the combination of a combined chuck unit comprising a draw chuck housing and a loading chuck housing initially spaced one from another and including individual power means for closing the respective chucks and a second device adapted to move said chucks toward and away from each other, a floating tie bar extending freely beneath the beams, tie members between one of said chuck housings and the tie bar, and an adjusting screw movably connected to the chuck unit and adjacent beam adapted to shift said chuck unit in a lateral direction.

14. In a stretch press adapted to the forming of sheet material into a shaped section including a supporting frame comprising parallel beams, the combination of a loading and draw chuck unit mounted on the frame comprising a draw chuck housing and a loading chuck housing initially spaced therefrom extending across the beams, a power device for closing the loading chuck and a second power device for closing the draw chuck, another power device connected to both the draw chuck and the loading chuck adapted to move said chucks toward and away from each other, a floating tie bar extending beneath the beams and initially out of engagement therewith, tie rods between one of said chuck housings and the tie bar and an adjusting screw operably connected between each end of said last housing and the adjacent beam adapted to independently shift each end of said housing in a lateral direction.

15. In a stretch press adapted to the forming of sheet material into a shaped section including a supporting frame comprising parallel beams and a reciprocable forming head cooperable therewith, the combination of a combined loading and draw chuck unit positioned at the edge of the forming head comprising a draw chuck housing extending across and resting upon the upper flanges of said beams, a loading chuck initially spaced from the draw chuck including a power device for closing the loading chuck and a second power device attached to the respective chucks adapted to move said chucks toward and away from each other, a floating tie bar extending beneath the beams and out of contact therewith, tie rods between the draw chuck and the tie bar, and an adjusting screw movably connected to each end of the draw chuck and the adjacent beam adapted to independently shift each end of said draw chuck laterally relative to its long axis.

16. In a stretch press including a base frame, a forming head and means for raising and lowering the forming head: a chuck unit on opposite sides of the forming head, each chuck unit including a draw chuck and a straightening chuck thereabove, said chucks being in alignment, pressure fluid means for moving the straightening chuck toward and away from the draw chuck, pressure fluid means for opening and closing the straightening chuck, the straightening chuck being capable of an appreciably greater range of movement in opening and closing than the draw chuck and means for centering the straightening chuck in alignment with the draw chuck.

17. In a stretch press including a base frame, a forming head and means for raising and lowering the forming head: a chuck unit on opposite sides of the forming head, each chuck unit including a draw chuck and a straightening chuck thereabove, said chucks being in alignment, pressure fluid means for moving the straightening chuck toward and away from the draw chuck, pressure fluid means for opening and closing the straightening chuck, the straightening chuck being capable of an appreciably greater range of movement in opening and closing than the draw chuck, means for centering the straightening chuck in alignment with the draw chuck and means for adjustably varying the position of the chuck units with respect to each other.

18. In a stretch press for sheet material, including a frame and a movable forming head, the combination of: a draw chuck adjacent the forming head, said draw chuck being adapted to grasp sheet material by edge areas thereof; a loading chuck positioned between the draw chuck and forming head, said loading chuck having a closing line in alignment with the closing line of the draw chuck and arranged to grasp sheet material along an area removed from the edge of such sheet material; and means for moving said chucks toward each other to insert edge areas of material held by the loading chuck into position within the draw chuck.

19. In a stretch press of the character stated in claim 2, the provision of selectively operable means for moving the straightening chuck and sheet material held thereby toward the draw chuck to insert edges of said sheet material into the draw chuck.

20. In a stretch press of the character stated in claim 3, the provision of selectively operable means for moving the straightening chuck and sheet material held thereby toward the draw chuck to insert edges of said sheet material into the draw chuck.

ALBIN K. PETERSON.

REFERENCES CITED

The following references are of record in the file of this patent:

UNITED STATES PATENTS

| Number | Name | Date |
|---|---|---|
| 2,123,683 | Oecki | July 12, 1938 |
| 2,346,213 | Flowers | Apr. 14, 1944 |
| 2,326,470 | Lermont et al. | Aug. 10, 1943 |
| 2,368,478 | Landwier | Jan. 30, 1945 |
| 1,710,261 | Kellogg | Apr. 23, 1929 |